(12) United States Patent
Odom et al.

(10) Patent No.: US 6,214,092 B1
(45) Date of Patent: Apr. 10, 2001

(54) FRACTURING MATERIAL SEPARATOR APPARATUS

(76) Inventors: Larry G. Odom, P.O. Box 1486;
Ronnie L. Stovall, P.O. Box 751, both of Elk City, OK (US) 73648

(*) Notice: Subject to any disclaimer, the term of this patent is extended or adjusted under 35 U.S.C. 154(b) by 0 days.

(21) Appl. No.: 09/190,372

(22) Filed: Nov. 12, 1998

(51) Int. Cl.[7] ................................................ B01D 19/00
(52) U.S. Cl. ........................ 95/253; 95/262; 96/158; 96/161; 96/168; 96/170; 96/183; 96/184; 96/187; 96/198; 96/215; 96/220; 210/188
(58) Field of Search ........................... 95/241, 253, 254, 95/259, 260, 262; 96/156–157, 158, 159, 160, 161, 162, 168, 173, 170, 182, 183, 184, 187, 188, 189, 198, 204, 207, 215, 220; 210/188

(56) References Cited

U.S. PATENT DOCUMENTS

| | | | | |
|---|---|---|---|---|
| 2,595,602 | * | 5/1952 | Parks | 96/190 |
| 2,610,697 | * | 9/1952 | Lovelady et al. | 96/157 |
| 2,868,315 | * | 1/1959 | Chaple et al. | 96/190 |
| 3,385,031 | * | 5/1968 | McMinn | 96/215 |
| 3,413,778 | * | 12/1968 | Lavery et al. | 96/190 |
| 3,688,473 | * | 9/1972 | Brown | 96/159 |
| 4,012,207 | * | 3/1977 | Jones | 95/253 |
| 4,059,517 | * | 11/1977 | Strahorn et al. | 95/253 |
| 4,187,087 | | 2/1980 | Whitescarver . | |
| 4,247,312 | | 1/1981 | Thakur et al. . | |
| 4,435,196 | * | 3/1984 | Pielkenrood | 96/184 |
| 4,539,023 | * | 9/1985 | Boley | 96/190 |
| 4,583,998 | * | 4/1986 | Reid et al. | 95/253 |
| 4,730,634 | * | 3/1988 | Russell | 96/157 |
| 4,948,393 | | 8/1990 | Hodson et al. . | |
| 4,995,495 | * | 2/1991 | Krynski | 96/184 |
| 5,415,776 | | 5/1995 | Homan . | |
| 5,427,685 | * | 6/1995 | Thorley | 96/190 |
| 5,513,704 | | 5/1996 | Sander . | |
| 5,558,780 | | 9/1996 | Vancas . | |
| 5,570,744 | | 11/1996 | Weingarten et al. . | |
| 5,637,234 | | 6/1997 | McCasland . | |
| 5,718,298 | | 2/1998 | Rusnak . | |
| 5,900,137 | * | 5/1999 | Homan | 96/185 |
| 5,928,519 | * | 7/1999 | Homan | 96/185 |

* cited by examiner

Primary Examiner—Duane S. Smith
(74) Attorney, Agent, or Firm—Crowe & Dunlevy; Bill D. McCarthy; Phillip L. Free

(57) ABSTRACT

A separator apparatus for separating flush effluent from an oil and gas well following a fracture stimulation process, the separator having a vessel that maintains the effluent at a selected liquid level, an inlet is connected to the vessel at a location below the liquid level so that the effluent enters the vessel at a location therebelow. A plurality of baffles within the vessel slow the effluent so that solids settle out to a drain which is periodically opened to transfer the solids to an appropriate disposal. An upper outlet permits the venting of gases that percolate from the liquid constituent, a backpressure valve disposed in communication therewith to maintain a positive pressure within the vessel. A liquid drain withdraws the liquid constituent from the vessel at a rate determined by a level assembly.

24 Claims, 7 Drawing Sheets

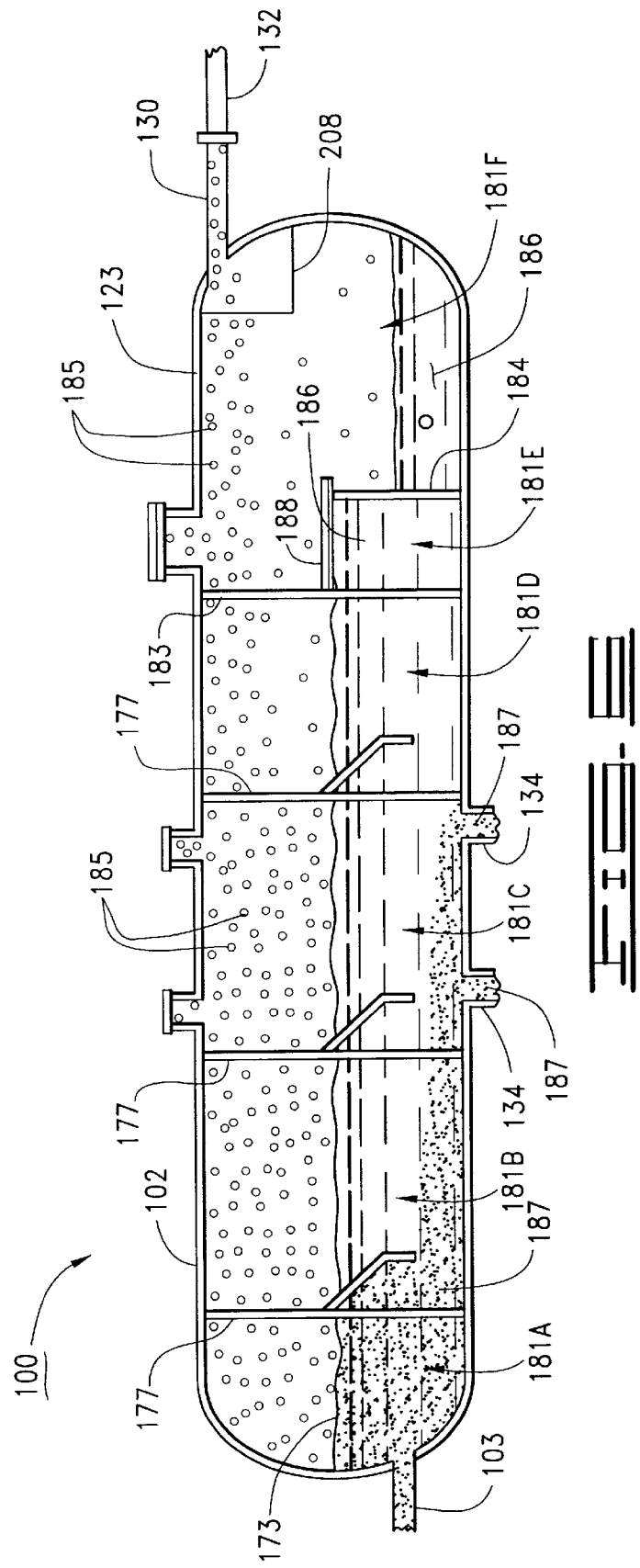

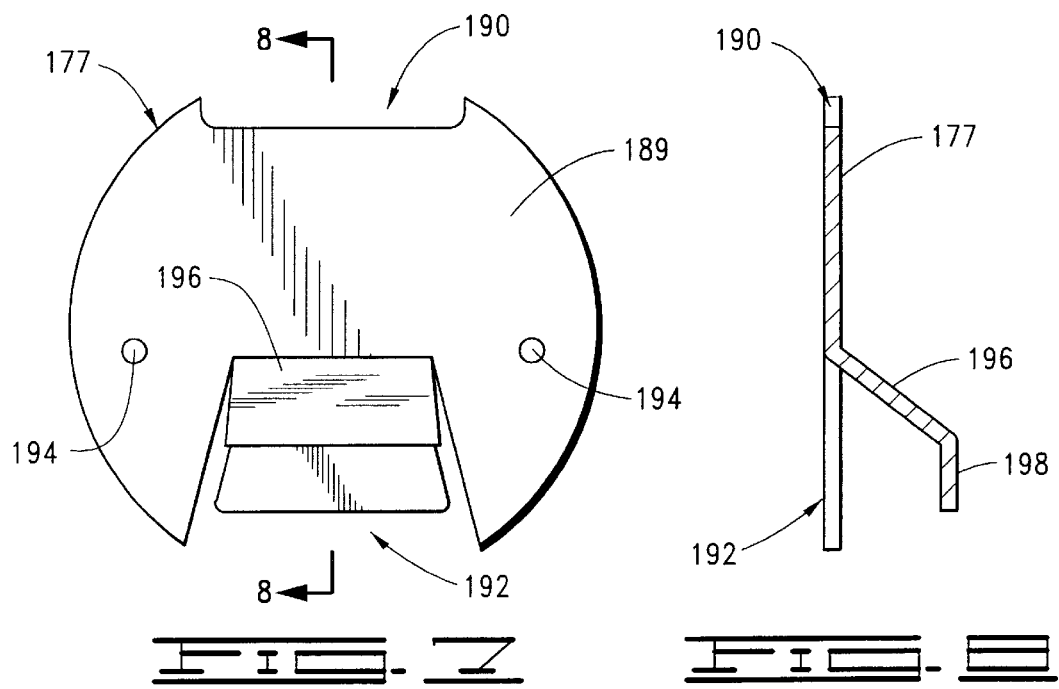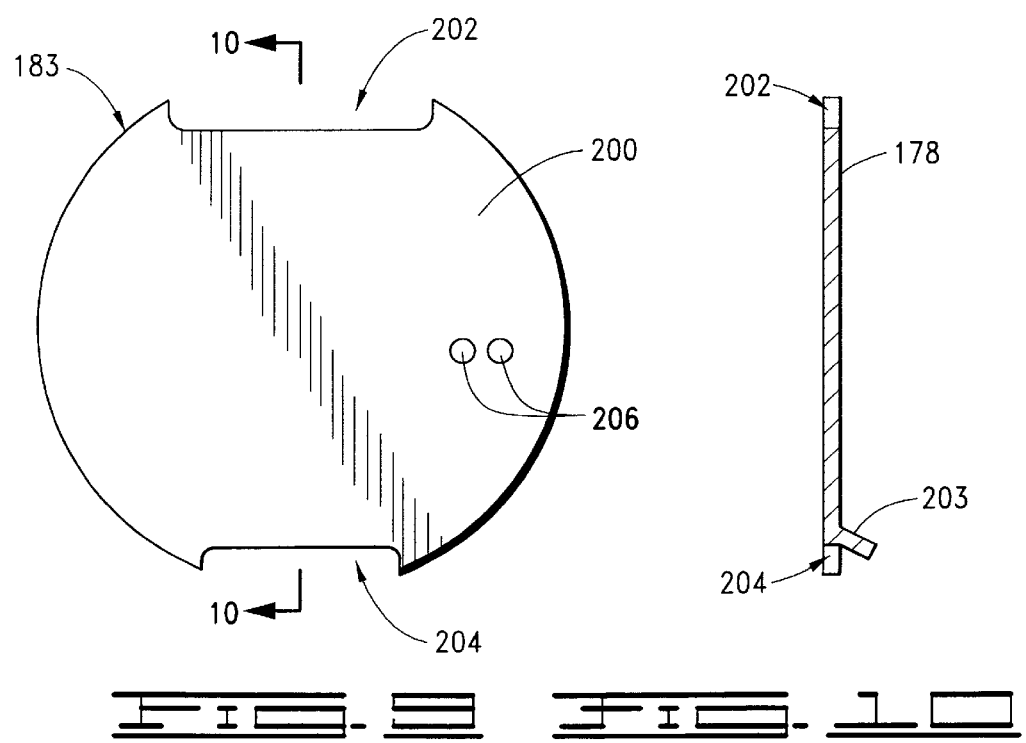

FRACTURING MATERIAL SEPARATOR APPARATUS

FIELD OF THE INVENTION

The present invention relates generally to the field of oil well servicing and workovers and more particularly, but not by way of limitation, to a separating apparatus for the safe and environmentally sound recovery of stimulation materials and subterranean debris following an oil well stimulation.

BACKGROUND

Oil and gas wells are often stimulated in order to enhance production. Stimulation techniques are employed to make marginal wells economically feasible for continuing production. Most stripper wells would not be financially viable absent the advances in stimulation techniques available in the art today. Although there are numerous stimulation methods that have gained credence in the art, the most widely used methods involve the use of explosives, acidizing, and fracturing.

One explosive approach is nitro-shooting, which involves the use of explosive detonations at select subterranean locations to shatter and fracture a geological formation. The fractured formation is thusly provided increased permeability, resulting in increased production capability. The use of subterranean explosives is almost as old as the oil industry itself. More recently, the use of explosives has given way to the use of guns that fire bullets into the formation. This enhances the ability to direct the fracturing relative to a desired fault line, the results being more predictable than the relatively random effects of underground explosives.

Acidizing has 19th century origins and was fully recognized as a viable well stimulation method by the 1930s. Acidizing involves subterranean injection of acid into an acid-soluble formation where the dissolving action enlarges openings in the formation to increase permeability. Many techniques are employed to localize and direct the dissolving reaction, such as packing or cementing portions of the casing to isolate the treatment region. Acidizing has more recently been widely replaced with hydraulic fracturing.

First introduced in the late 1940s, hydraulic fracturing sparked immediate and widespread acceptance as a viable method of increasing the permeability of a well. Unlike acidizing, fracturing is effective in any type of formation and can be combined with acidizing for even better results in certain formations. This method consists generally of injecting a fracturing fluid and propping agent mixture into the formation and applying pressure, typically a hydraulic pressure, to reopen existing fractures and create new ones. The propping agent commonly is an appropriately sized silica sand.

After the hydraulic pressure has forced open the fractures in the formation, a portion of the propping agent remains wedged in the fractures to hold the fractures open. The oil and gas subsequently produced thereby flows through the embedded propping agents that remain wedged in the fracture.

All of these stimulation methods have in common the need to clean the stimulated area, drill string, and casing before resuming oil and gas production. Debris from explosives—residue from acidizing and propping agent particles from fracturing—similarly must be flushed from the well prior to resuming production. The well formation pressure is used to expel the debris and residue; that is, prior to returning to service, the well is first operated to produce a flush stream to flush the debris from the well. The mixture of oil and gas products with debris, otherwise referred to as a flush effluent, must be disposed in an appropriate manner. In the past, the flush effluent was commonly discharged into open earthen pits where the gases and liquids evaporated and the solids were then buried or hauled away for disposal.

Concerns about pollution leaching into the soil and jeopardizing potable water tables have stimulated state and federal legislation to effectively eliminate the use of earthen pits for storing the flush effluent. Today, in most cases, the flush effluent must be handled as a hazardous waste material. The current common practice is to collect the flush effluent as a whole, that is, as a mixture of subterranean fluids and debris. The flush effluent is typically delivered into a storage container, such as a frac tank. There are, however, generally recognized difficulties associated with collecting and hauling off the flush effluent as a whole.

One problem is associated with the erosive nature of the flush effluent. The formation pressure that delivers the flush effluent is typically high, and the propping agent sufficiently abrasive, so that the flush effluent stream can quickly cut away the steel floor of a frac tank. Extensive monitoring and frequent repair of the tanks is necessary to prevent catastrophic leaks. Should a tank fail while in transit, waste spills can result in public areas, thereby creating unacceptable environmental hazards.

Another problem is associated with the relative expense involved with collecting the effluent as a mixture rather than as separated constituent parts. By separating the effluent into constituent parts before disposal, significant improvements in operating efficiency are realized. It would be desirable to perform an on-site separation, but commercial separators available in the art, those typically used in other operations such as the recovery of drilling fluid, are inherently incapable of separating the effluent at hand given the characteristic throughput requirements.

For example, U.S. Pat. No. 5,718,298, issued to Rusnak, teaches a separator for separating the constituent parts of gases and solids in a drilling fluid where air is the primary constituent. Since the separator of Rusnak '298 separates two constituents, it is commonly referred to as a two-stage separator. Three-stage separators, capable of separating solids, liquids and gases, are similarly employed to dispose of drilling fluids, such as those taught by U.S. Pat. No. 5,415,776 issued to Homan and U.S. Pat. No. 4,247,312 issued to Thakur et al.

One skilled in the art will recognize that these and other commercial separators available in the prior art are not suited for the characteristics of an effluent flow like that of concern in the present invention. The velocity and abrasiveness of the effluent resulting from a fracturing procedure is far too aggressive to be operatively controlled by the structural components of these devices. Particularly, the involute of Homan '776 and the deflector plates of Rusnak '298 would be quickly eroded and thus rendered ineffective under the conditions of recovering fracturing materials from a well. Thakur '312 teaches a separator having a relatively low velocity inlet stream wherein the solids settle out directly beneath the inlet. This is an unworkable solution because the relatively high velocity of the effluent stream of present concern is too aggressive to succumb to the settling action of solids and weiring action of liquids provided by the separator of Thakur '312.

Although U.S. Pat. No. 5,513,704 issued to Sander makes provision for the relatively aggressive characteristics of a flush effluent of present concern, there is lacking the capability for three-stage separation of the flush effluent. The gas constituent is separated from the flush effluent, but the solids and liquids are removed from the collection vessel as a mixture and must therefore be separated remotely from the collection vessel. As such, there is lacking in the prior art any solution that provides a self-contained apparatus for the separating of all constituents, that is, solid, liquid, and gas constituents, before removal thereof from the receiving vessel.

A more serious problem lies in the flammable propensity associated with methods of collecting the flush effluent. The flush effluent typically contains flammable hydrocarbons, both liquid and gaseous, and also contains subterranean fragments and fracturing materials that are delivered at a high velocity into the storage tank. The impacting fragments against the steel tank often create sparks, which in the presence of combustion air and the hydrocarbons can result in a fire or explosion. Today it is a common precaution to keep a ready supply of drilling mud on hand for the sole purpose of extinguishing a fire resulting from these conditions. This reactive approach to a known dangerous condition has tragically harmed numerous oil well personnel. Even assuming that injuries could be prevented, the property losses stemming from fire damage to wells and equipment is significant. The health, safety, and equipment costs associated with meeting the environmental concerns at hand are widely recognized as significant. These costs justify the use of a separator that eliminates the possibility of fire or explosion in recovering the effluent.

The Sander '704 separator fails to contemplate the flammable nature of recovering the effluent of present concern. Sander '704 teaches the use of an impact deformable member, such as a green hardwood log, to divert the effluent flow in a receiver vessel. The propants and the debris in the inrushing effluent embed in the deformable member, providing an erosion resistant diverter surface. Although this may solve the erosion problem associated with recovering the effluent at hand, the propant and fragments that subsequently strike the embedded propant and fragments will create sparks, and the sparks are in the presence of combustion air and fuel.

Hence Sander '704 fails to resolve the inherent safety concerns associated with recovery of the effluent at hand.

There is, therefore, a need in the industry for an improved separating apparatus to collect the flush effluent from a well-site stimulation, such as the fracturing material used in hydraulically fracturing a formation to increase permeability. The apparatus would advantageously capture the effluent as delivered at the formation pressure and process the effluent to separate the constituent parts and safely dispose of the constituents in a self-contained manner.

SUMMARY OF THE INVENTION

The present invention provides an apparatus for collecting and separating a flush effluent that is delivered by the formation pressure of a subterranean oil and gas well after a well stimulation. The flush effluent is a mixture of constituents such as solids, liquids, and gases made up of subterranean fluids and debris as well as propants that remain subsequent to a well stimulation, such as from a fracturing procedure.

The apparatus of the present invention has a vessel adapted to support a liquid bed and to receive the effluent from the well into the liquid bed. The liquid bed can be initially provided by pumping an appropriate liquid into the vessel which is subsequently removed proportionately to the rate that effluent enters the vessel so as to maintain a preselected level of liquid in the vessel. That is, as effluent is admitted to the vessel the rate at which liquid is withdrawn from the vessel is determined by the rate at which a liquid constituent of the effluent enters the vessel so as to maintain the preselected level of liquid, or liquid bed.

An inlet is provided for admitting flush effluent to the vessel at a location below the liquid bed. A choke valve is supported by the inlet to meter the flow of flush effluent into the vessel, thus reducing the flow rate of the flush effluent to a preselected flow rate.

The flush effluent flows longitudinally within the vessel and encounters a plurality of baffles which consecutively slow the flush effluent velocity, allowing solids in the flush effluent to settle to the bottom of the vessel and the gases of the flush effluent to percolate to the top of the vessel where a vent is provided for removing the gases. Separate drains are provided to permit removal of accumulated solids and liquids.

A backpressure manifold is connected to the vent, having a backpressure valve for controlling the flow of gas exiting the vent so as to maintain a preselected internal pressure in the vessel. The backpressure manifold further has an emergency valve fluidly in parallel with the backpressure valve in the event the vessel pressure exceeds a preselected pressure.

The liquid constituent of the effluent is withdrawn at a forward end of the vessel, at a location downstream of where the solids settle out and the gases percolate out. The liquid constituent is withdrawn from the vessel at a rate to maintain a preselected level of the liquid bed above the inlet. A portion of the liquid can be recirculated into the choke valve to provide a continuous flow through the choke valve and vessel to prevent freezing during certain operating conditions.

An object of the present invention is to provide a well-site separator capable of separating the gaseous, liquid and solid constituents of a flush effluent and the like. Other objects, features and advantages of the present invention will become apparent from the following detailed description when read in conjunction with the drawings and appended claims.

BRIEF DESCRIPTION OF THE DRAWINGS

FIG. 5 is a sectional view taken at 5—5 in FIG. 4.

FIG. 6 is a diagrammatical sectional view of the separating apparatus of FIG. 1 illustrating a preferred arrangement of internal baffles and the separation of the effluent constituents.

FIG. 7 is an elevational view of an internal baffle of the separating apparatus of FIG.

FIG. 8 is a sectional view of the baffle of FIG. 7 taken along the section line 8—8. 1.

FIG. 10 is a sectional view of the baffle of FIG. 9 taken along the section line 10—10.

DETAILED DESCRIPTION

The present invention provides an apparatus for separating a flush effluent, sometimes referred to herein simply as "effluent," that is flushed from an oil and gas well after a stimulation procedure. The effluent of present concern is commonly a mixture of subterranean fluids including oil, gas and water, along with debris from the stimulation such as propping agents (or propants) and subterranean fragments. The separator apparatus of the present invention receivingly processes the flush effluent to separate the gaseous, solid, and liquid constituents for safe and environmentally sound disposal thereof.

Figure 1:
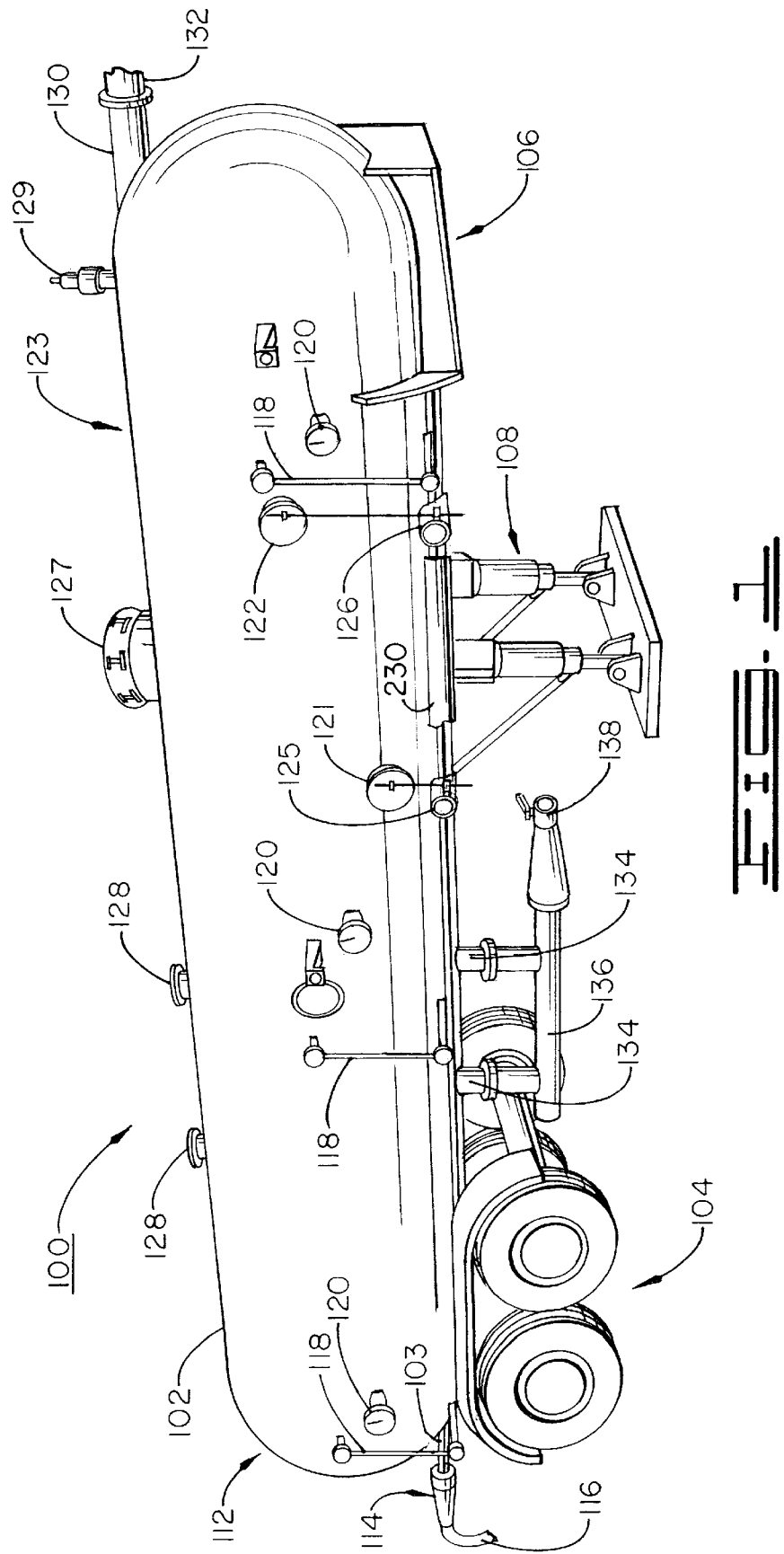
FIG. 1 is a perspective view of a separating apparatus constructed in accordance with a preferred embodiment of the present invention.

FIG. 1 shows a perspective view of a separator apparatus 100 constructed in accordance with a preferred embodiment of the present invention. A vessel 102 is supported by a wheel assembly 104 and a hitch assembly 106 for transport in a conventional manner by a towing vehicle bearing an appropriate hitch receptacle (not shown). In this manner the separator apparatus 100 is transported to the well site in the manner of a trailer, the towing vehicle capable of disconnecting from the separator apparatus 100 which is supportable upon a pair of telescoping support legs 108 which serve to support and level the vessel 102. Although the vessel 102 illustrated in FIG. 1 is a horizontally disposed, straight barrel tank, a commonly used snub-nose tank could be equivalently used in construction of the present invention to benefit from towing with a smaller towing vehicle. Also, a skid mounted vessel is within the contemplation of the present invention, as is commonly employed in transporting and using portable oilfield equipment.

At an entry end 112 the vessel 102 has an inlet 103 supporting a choke valve 114 which is connectable to a production line 116. The production line 116 provides a conduit for transferring the effluent from an oil and gas well (not shown) to the vessel 102. The choke valve 114 restricts an inlet flow rate of the effluent below that of a preselected flow rate. Alternatively the choke valve can be located at the well head of the oil and gas well, at the opposite end of the production line 116.

It will be noted that a separator built in accordance with a preferred embodiment of the present invention admits effluent into the vessel 102 at an inlet 103 that is below the surface of a liquid bed inside the vessel 102. The liquid bed serves to cushion the inrushing effluent to slow the flowing effluent to a workable velocity. The liquid bed furthermore serves to prevent inrushing fragments or propants from striking against internal components within the vessel 102 in the presence of combustion air. This prevents the flammable condition that otherwise occurs wherein sparks and heat are created in the presence of combustion air and fuel.

When the separator apparatus 100 is operational, the liquid bed provides a static fluid head above the inlet 103. As will be evident by the following discussion, as effluent is recovered the liquid bed is maintained by removing liquid from the vessel 102 at a rate to balance the incoming flow of liquid constituent so as to maintain a desired liquid level above the inlet 103. It is advantageous to provide the liquid bed before beginning recovery operations, so that the first effluent admitted to the vessel 102 enters the liquid bed. An initial liquid bed can therefore be provided by initially admitting a fill liquid, such as a brine solution, to the vessel 102 to the preselected level. Alternatively, such as when an appropriate fill liquid is not available, the effluent can be trickled into the vessel until a sufficient liquid bed accumulates.

As noted, the liquid bed is provided initially either by admitting the effluent under controlled conditions or by admitting a fill liquid, and the liquid bed is thereafter supplemented by the liquid constituent of the effluent. For purposes of the following discussion, therefore, the term liquid applies equivalently to the fill liquid and to the liquid constituent of the flush effluent.

A number of sight glasses 118 provide visual indication of the liquid level inside the vessel 102 at selected locations. A number of temperature gauges 120 indicate the temperature of the effluent at select locations. The locations selected for each sight glass 118 and temperature gauge 120 correspond to the longitudinal position of particular separating chambers inside the vessel 102, as described below. Monitoring the temperature of the effluent can be advantageous in preventing ice from accumulating within the vessel 102 which can restrict fluid flow. Freezing conditions can arise under certain conditions, such as operating in sub-freezing ambient conditions, and from recovering an effluent containing certain constituents such as carbon dioxide.

A pair of conventional floats 121, 122 monitor the level of the liquid in a forward end 123 of the vessel 102 to control the rate at which the liquid is withdrawn from the vessel 102. As shown in FIG. 1, the floats 121, 122 are each linked to a corresponding mechanical dump valve 125, 126 so that when a selected level is reached the floats 121, 122 open the respective dump valves 125, 126 to remove liquid. In this manner there is provided a balance of the outflowing liquid and the inflowing liquid so as to maintain the liquid bed above the inlet 103. Alternatively, in another embodiment the floats 121, 122 can each provide an input signal in a conventional manner to a corresponding motorized valve (in place of dump valves 125, 126) to automatically control and throttle, if desired, the rate at which liquid is withdrawn from the vessel 102.

On top of the vessel 102 a man way access 127 is provided for access by an operator into the vessel 102, such as for inspection or maintenance. A pair of smaller clean out caps 128 cover openings in the vessel 102 that accommodate the use of a power washer to clean the vessel 102 at a location where the solid constituent of the effluent settles out, as discussed below. The man way access 127 and the clean out caps 128 are constructed in a conventional manner of a hinged cover having an open position for access and a closed position where a sealing engagement within the vessel 102 is provided. A pressure relief valve 129 is provided to relieve the vessel 102 internal pressure in the event a preselected limit is exceeded. An outlet 130 is connected to a discharge line 132 for removing the gaseous constituent of the effluent from the vessel 102.

Mounted below the vessel 102 is a pair of drains 134 wherein the solid constituent is collected. The drains 134 can be connected to a common header 136, and a valve 138 on the header 136 can be periodically opened in order to purge an accumulation of solids from the vessel 102. It is advantageous to provide a sufficiently large vessel 102 and drains 134 in order to provide a capacity to retain all the solid constituent from the clean up procedure. In this way the solids can be hauled off in the vessel 102 for disposal at an appropriate remote site. Alternatively, the header 136 can serve as a conduit to transfer the solid constituent to a storage container at the well site.

Figure 2:
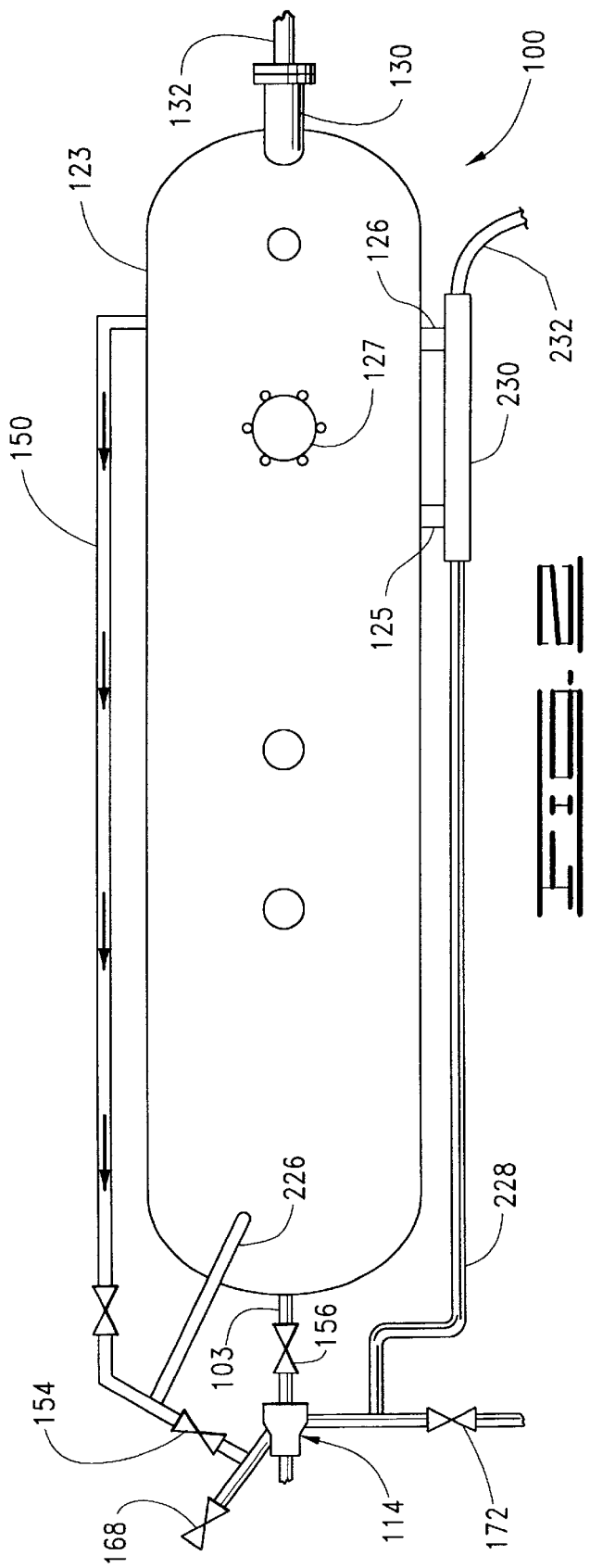
FIG. 2 is a semi-detailed, top view of the separating apparatus of FIG. 1.

FIG. 2 is a top view of the separator apparatus 100 of FIG. 1 further showing a recirculation line 150 that fluidly connects the forward end 123 of the vessel 102 with the choke valve 114. The opening of a valve 154 provides a continuous flow of liquid through the choke valve 114 and into the inlet 103 as necessary to prevent freezing. This recirculation of liquid flow is provided both by the positive pressure in the forward end 123 of the vessel 102 and by the venturi effect provided by the inrushing effluent relative to where the recirculation line 150 fluidly connects to the choke valve 114. The recirculation of fluid is particularly advantageous under certain operating conditions which tend to induce freezing of the effluent as it expands downstream of the choke valve 114. As noted, one such condition is where sub-freezing ambient conditions chill the inlet 103. Another condition occurs when the effluent contains certain constituents such as carbon dioxide.

Figure 3:
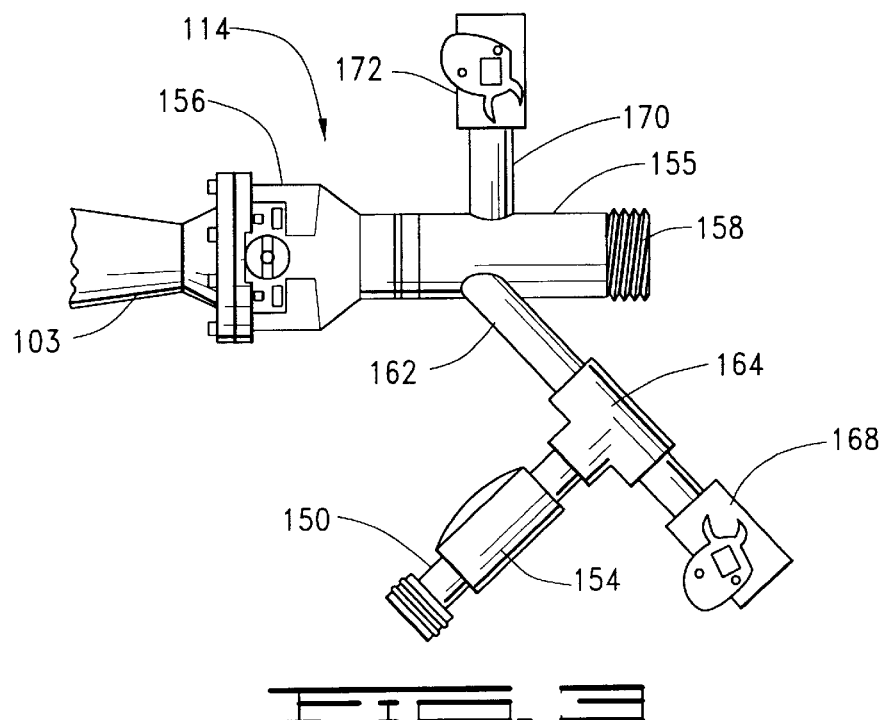
FIG. 3 is a top view of the choke valve of FIG. 2.
Figure 4:
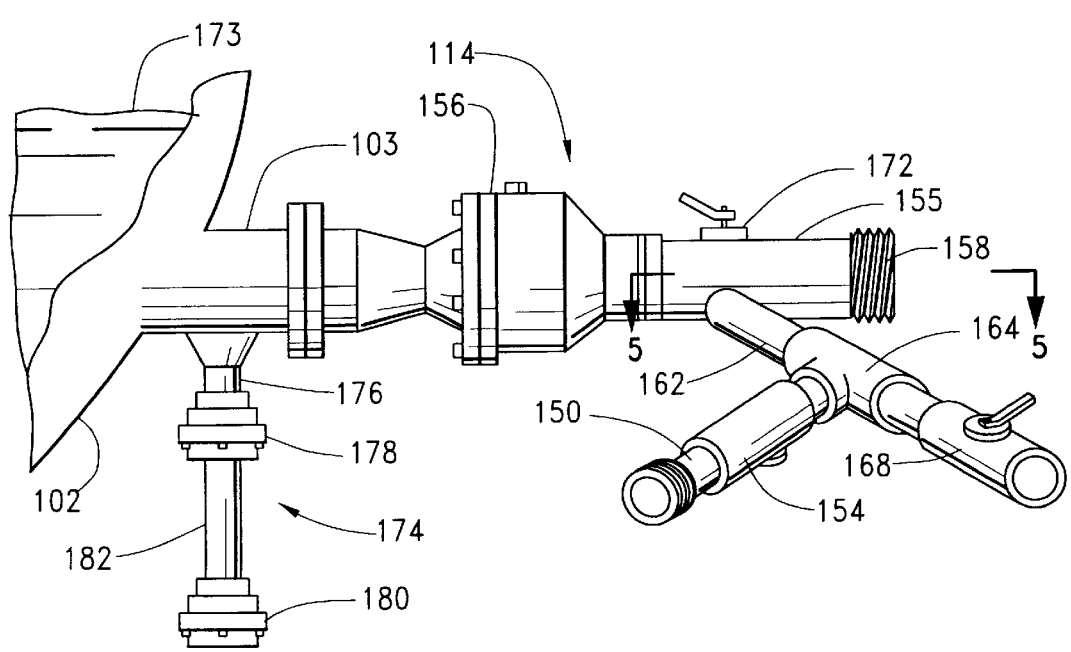
FIG. 4 is a side view of the choke valve of FIG. 3.

FIG. 3 shows a top view of the choke valve 114, formed by an attachment of a conventional choke valve housing 155 to a valve 156. FIG. 4 is a side view of the choke value 114 and FIG. 5 is a sectional view taken along the line 5—5 of FIG. 4.

The choke valve housing 155 has a threaded end 158 for threading engagement with the production line 116 (see FIG. 1). FIG. 5 shows a positive pressure choke bean 159 is supported by a choke bean holder 160 having an annular tailpipe portion 161 receivingly disposed within the choke valve housing 155. The choke bean 159 is sized in a manner well know to a skilled artisan for controlling the effluent flow rate into the vessel 102.

FIGS. 3 through 5 show the manner in which the recirculation line 150 is fluidly connected to the inrushing effluent flow. The choke valve housing 155 supports a nipple 162 and a tee 164 attached at a distal end thereof. The valve 154 is shown in the recirculation line 150 connected to the tee 164. The nipple 162 fluidly connects the recirculation line 150 with the tailpipe 161 so that the inrushing effluent creates a venturi effect that draws fluids from the recirculation line 150 into the effluent stream. Also connected to the tee 164 is a valve 168 used for the injection of fluids into the vessel 102. For example, in some instances it is advantageous to inject methanol to enhance the freeze-protection. Also, fluids such as diesel fuel can be injected as a defoaming agent.

In the choke valve 114 shown in FIG. 3, opening the valve 154 provides a flow passage for liquid through the recirculation line 150 and through the valve 156 into the inlet 103 of the vessel 102. This provides for a continuous liquid flow through the vessel 102 even when the effluent being recovered contains no liquid constituent. As noted previously, this is particularly advantageous when operating under conditions conducive to freezing, such as low temperature and carbon dioxide recovery. Alternatively, as noted above, closing valve 154 and opening the valve 168 allows injection of fluids during operation of the separating apparatus 100. It is possible that under certain conditions both valves 154, 168 could be open to provide simultaneous recirculation and injection.

An opposing nipple 170 on the choke valve housing 155 supports a valve 172 that is connectable to a fill liquid supply line (not shown) used to fill the vessel with the fill liquid to provide the initial liquid bed. FIG. 4 illustrates this start up condition wherein the vessel 102 is filled with a liquid, such as a brine solution, to a liquid level 173 above the inlet 103.

Also shown in FIG. 4 is a sampling assembly 174 that is used to withdraw a sample of the effluent during processing. The sample is advantageous in determining the status of a well clean up procedure, as in determining the amount of solids contained in a sample. When the solids content of the flush effluent drops below a threshold amount the recovery procedure can be declared completed.

The sampling assembly 174 has an upper nipple 176 which is connected to the inlet 103 and from which an upper valve 178 and a lower valve 180 depend, separated by a lower nipple 182. A sample is collected by closing the lower valve 180 and opening the upper valve 178 at a time when the effluent is passing through the inlet 103 into the vessel 102. The valve 180 can be cracked open to bleed air trapped between the valves 178, 180. A sample of the effluent will be collected in the lower nipple 182, and is retrieved by closing the upper valve 178 and opening the lower valve 180 after placing a collection vessel, such as a beaker, below the lower valve 180.

Turning now to FIG. 6, a diagrammatic sectional view illustrates generally the manner in which the solid, liquid, and gaseous constituents of the effluent are separated by the separator apparatus 100. The flush effluent enters the vessel 102 through the inlet 103 and under the static head of the fluid bed provided by the liquid level 173. It will be noted the effluent therein passes generally in a directed flow toward the forward end 123 of the vessel 102, the flow induced by the momentum with which the effluent enters the vessel 102.

In flowing from the inlet 103 toward the forward end 123, the effluent encounters first, second and third baffles 177. Thereafter the effluent encounters a fourth baffle 183, and a fifth baffle 184. The baffles 177, 183, 184 cooperate with interior portions of the vessel 102 to form a plurality of sequential separating chambers designated as: a first chamber 181A; a second chamber 181B; a third chamber 181C; a fourth chamber 181D; a fifth chamber 181E; and a sixth chamber 181F. The baffles 177, 183 and 184 will be described below.

The greatest turbulence is found in the first separating chamber 181A, where the inrushing effluent encounters the restriction provided by the first baffle 177. The longitudinal flow of the effluent in combination with a downward force of gravity urges the solids 187 toward the drains 134. In this manner the solids 187 accumulate in the drains 134 for removal by opening the valve 138 (see FIG. 1).

Similarly, the gaseous constituent 185 percolates upwardly out of the flush effluent and rises toward the top of the vessel 102. By controlling the internal pressure of the vessel 102 below a predetermined value by means of a backpressure valve in the conduit 132, discussed herein below, the gaseous constituent 185 can be collected via the outlet 130.

At the forward end 123 of the vessel 102, downstream of the baffles 177 an effectively filtered liquid 186 is collected in the fourth, fifth and sixth separating chambers 181D, 181E, 181F. The liquid 186 in the fourth separating chamber 181D is withdrawn by cooperation of the float 121 and the dump valve 125 (see FIG. 1). The liquid 186 in the sixth separating chamber 181F is withdrawn by cooperation of the float 122 and the dump valve 126 (see FIG. 1).

A conduit 188 provides passage for liquid from the fourth chamber 181D at a time when the dump valve 125 alone is unable to remove liquid at a sufficient rate to maintain the preselected liquid bed level. It will be noted the conduit 188 transfers the liquid from the fourth chamber 181D to the sixth chamber 181F, thus bypassing the fifth chamber 181E. In this manner, the cleanest liquid is maintained in the fifth chamber 181E for use in the recirculation line 150.

FIG. 7 is an elevational view of one of the baffles 177, and FIG. 8 is a sectional view thereof taken along the line 8—8 in FIG. 7. Each of the baffles 177 has a planar plate portion 189 with an upper opening 190 and a lower opening 192. The upper opening 190 provides free passage for the gaseous constituent 185 along the top of the vessel 102 toward the outlet 130. The lower opening 192 provides restricted passage for the liquid constituent of the flush effluent. A pair of openings 194 provide a flow path for liquid from a downstream chamber to an upstream chamber. For example, the relatively high velocity of the inrushing effluent would force the liquid bed out of the first chamber 181A were it not for a return path for the liquid to flow back from the chamber 181B into the chamber 181A.

Each baffle 177 forms a trailing deflector 196 which is generally downwardly sloping from the planar plate portion 189. As shown in FIG. 8, the deflector 196 has a substantially vertical portion 198 that imparts a downwardly directed force on the effluent, which is a mixture of the liquid and the solid constituent 187. The deflector 196 thereby urges the solid constituent 187 toward the bottom of the vessel 102 where settling ultimately occurs.

Figure 9:
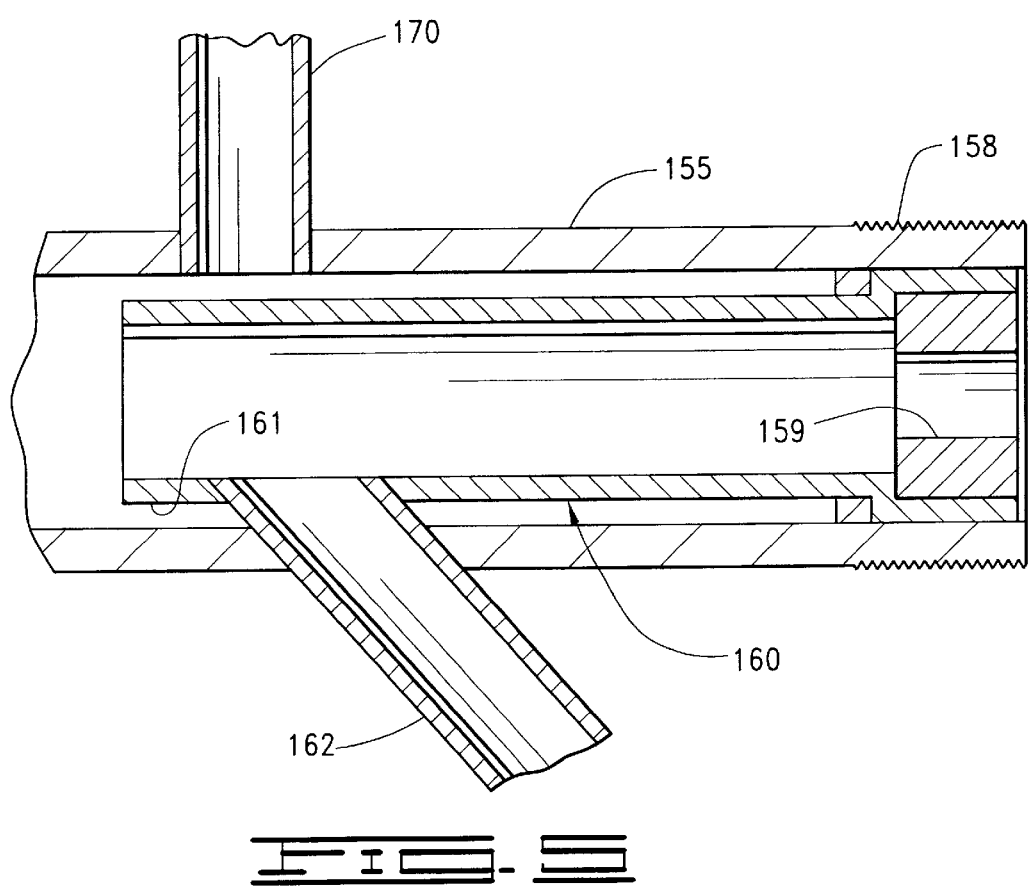
FIG. 9 is an elevational view of another internal baffle of the separating apparatus of FIG. 1.

FIG. 9 is an elevational view of the fourth baffle 183, and FIG. 10 is a sectional view thereof taken along the line 10—10 in FIG. 9. Similar to the first, second and third baffles 177, the fourth baffle 183 has a planar plate portion 200 with an opening 202 for passage of the gaseous constituent 185, an opening 204 for passage of liquid 186, and an opening 206 in fluid communication with the conduit 188 for overflow passage of liquid from the fourth chamber 181D to the sixth chamber 181F as described above. It will be noted that the opening 204 is relatively small in comparison to the openings 192 of the baffles 177, because the solids 187 having already been settled out, only a marginal opening is necessary to provide passage of the liquid 186 into the fifth chamber 181E. FIG. 10 shows the size of the opening 204 being minimized by a tab 203 bent slightly out of parallel relationship to the planar plate portion 200.

Figure 11:
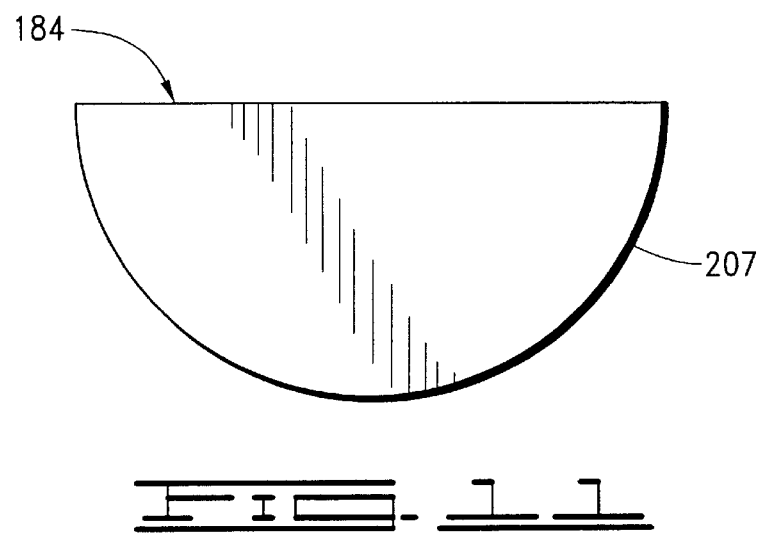
FIG. 11 is an elevational view of yet another internal baffle of the separating apparatus of FIG. 1.

FIG. 11 shows an elevational view of the fifth baffle 184 which provides a solid partition weir across a lower portion of the vessel 102 as an arcuate surface 207 is contoured to match a characteristic inner surface of the vessel 102, the fifth baffle 184 being sealingly attached thereto as in by a welded attachment therebetween. It will be noted from FIG. 6 that the conduit 188 is supported by the baffle 184, and that otherwise liquid from the fifth chamber 181E can spill over the baffle 184 into the sixth chamber 181F.

Returning with FIG. 6, liquid mist particles are carried with the gaseous constituent 185 percolating out and rising upwardly toward the outlet 130, thereby "wetting" the gaseous constituent 185. The amount of wetting is dependent on the velocity of the gaseous constituent 185 exiting the vessel 102. As depicted in FIG. 6, a mist eliminator or demister 208 is disposed in the vessel 102 adjacent to the outlet 130 to provide a mechanical barrier to the exiting gas. The mist eliminator 208 is of conventional design and causes the liquid particles to be slowed by the physical obstruction of the mist eliminator 208. The liquid particles coalesce on the surfaces and flow downwardly, dripping off the mist eliminator 208 into the sixth separating chamber 181F.

Preferably, the mist eliminator 208 is constructed of a perforated steel sheet. Alternatively, and without deviating from the scope of the present invention, the mist eliminator 208 can be formed of a knitted-wire mesh pad, or other equivalent material suitable for use as a demister media.

Figure 12:
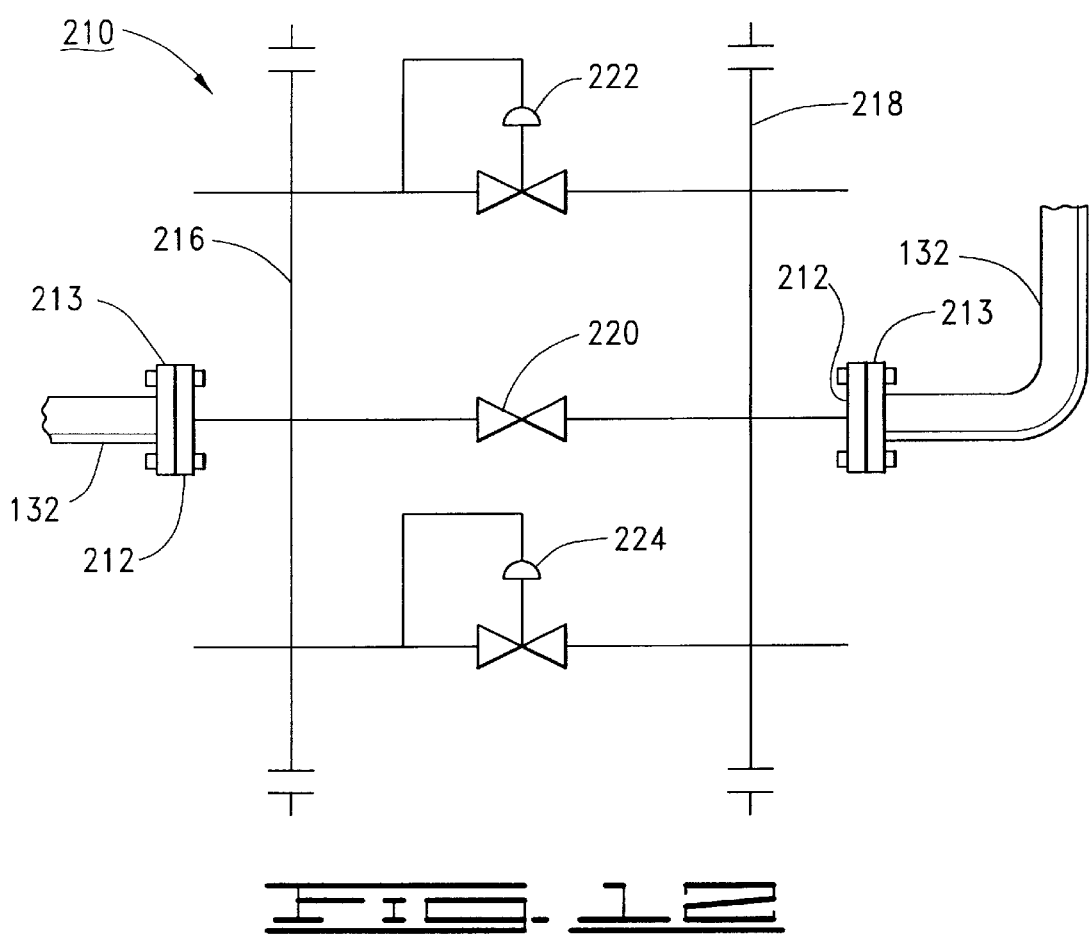
FIG. 12 is a semi detailed schematic of a backpressure manifold assembly.

The magnitude of pressure from the well formation that delivers the effluent to the vessel 102 is typically less than 10,000 psi in low pressure wells and 10,000 to 20,000 psi in high pressure wells. Even after choking the flow through the choke valve 114 the fluid pressure is significantly high. As mentioned above, backpressure is maintained in the vessel 102 by a backpressure manifold 210, shown in FIG. 12, that is connected to the discharge line 132 between the vessel 102 and a conventional flare (not shown) used to combust the gaseous constituent 185.

The backpressure manifold 210 can be provided as a unit operating within the discharge line 132, having a flange 212 for connection to the mating flange 213 of a segmented discharge line 132. The backpressure manifold 210 has an inlet header 216 and a outlet header 218 that are fluidly joined by a valve 220, a first backpressure valve 222 and a second backpressure valve 224. In this manner, a selected backpressure can be provided by setting the first backpressure valve 222 to a nominal desired working pressure in the vessel 102. The second backpressure valve 224 can be set at a maximum desired working pressure. The valve 220 provides a redundant safety pressure release in addition to the pressure relief valve 129 in the event the vessel 102 pressure continues to climb above the maximum desired working pressure.

Finally, returning to FIG. 2 it will be noted that a line 226 and a line 228 provide a flow path when valves 156, 168, 172, and 229 are closed for pressure from the vessel 102 to be communicated to a header 230 (partially shown in FIG. 1 for clarity) which joins the dump valves 125, 126 to a common dump line 232. In this manner the vessel 102 internal pressure can be used to purge the header 230 and dump line 232, such as when the recovery is complete and the recovery apparatus 100 is being readied for removal from the well site.

The present invention provides a separating apparatus (such as 100) for the recovery of an effluent following a stimulation procedure on an oil and gas well. The separating apparatus has a vessel (such as 102) with a choke valve (such as 114) connected at an inlet (such as 103) and a backpressure manifold (such as 210) connected to an outlet (such as 130) in order to maintain a selected internal pressure in the vessel.

The flush effluent enters the vessel under a liquid static head provided by a liquid bed maintained at a desired liquid level (such as 173). In starting up the separating apparatus, the fluid bed is initially provided by partially filling the vessel with liquid through a fill line connected to the choke valve. The fluid bed is maintained at the desired level so that effluent entering the vessel enters under the static head of the fluid, thereby providing a non-compressible medium for cushioning the inrushing effluent, and for preventing high velocity impacting of solids against vessel internals in the presence of combustion air.

The effluent flowingly encounters a series of baffles (such as 177, 183, 184). As the effluent flows, a solid constituent (such as 187) settle out to the bottom of the vessel and is collected within drains (such as 134) that can be periodically opened to withdraw the collected solids from the vessel. Furthermore, the gaseous constituent (such as 185) percolates upwardly out of the liquid and ultimately exits the vessel by way of an outlet. The exiting gaseous constituent passes through a mist eliminator (such as 208). Floats (such as 121, 122) monitor the liquid level and control dump valves (such as 125, 126) to balance the outflowing liquid with respect to the inflowing effluent so as to maintain the desired liquid level above the inlet.

A recirculation line (such as 150) can provide a continuous flow of liquid through the choke valve to prevent freezing, such as that which occurs at low ambient temperature or when recovering effluent containing carbon dioxide.

A backpressure manifold (such as 210) is connected to the outlet of the vessel in order to control the internal pressure of the vessel. The backpressure manifold provides a valve (such as 220) in parallel with one or more backpressure valves (such as 222, 224) which control the pressure in the vessel and provide pressure relief in the event of an abrupt or unanticipated pressure increase. A flare is connected downstream of the backpressure manifold to combust the gaseous constituent.

The foregoing description of a preferred embodiment of the present invention is exemplary and not itself limiting of the contemplated scope of the invention, wherein an effluent is received into a vessel and under the static head provided by a liquid bed and thereafter slowed by a baffle to induce the settling out separation of the solids and gaseous constituent of the effluent.

The separator apparatus of the present invention provides a safe and self-contained apparatus, permitting an associated method for the collection of effluent from an oil and gas well following a stimulation procedure. The receiver apparatus allows the user to remain in full compliance with modern legislation that prohibits the spilling of, or open pit storage of, the effluent. The collection is done in a safe manner by preventing conditions that are conducive to fire or explosive hazards in the collection vessel.

In carrying out the present invention with the separator apparatus 100 described above, an operator first connects the production line 116 from the oil and gas well to the choke valve 114 at the threaded connector 158. The oil and gas well has a shut off valve on the well head that remains closed while the valve 156 and valve 172 are opened to admit a fill fluid (usually a brine solution) into the vessel 102 to provide an initial liquid bed. The production line 116 is likewise filled with the fill fluid so that when the well head valve is opened the inrushing effluent is immediately dampened by the liquid bed.

As the flush effluent enters the vessel 102, the floats 121, 122 open and close the respective dump valves 125, 126 to maintain the desired liquid bed in the vessel 102. As needed, the recirculation line 150 is used by opening valve 154. Also, chemicals may be injected into the tank by opening the valve 168. The backpressure valves 222, 224 are set to provide a preselected internal pressure range on the vessel 102. As necessary, the valve 138 is opened to purge an accumulation of solids from the vessel 102.

It is clear that the present invention is well adapted to carry out the objects and to attain the ends and advantages mentioned as well as those inherent therein. While embodiments of the invention have been described for purposes of this disclosure, numerous changes can be made which will readily suggest themselves to those skilled in the art and which are encompassed within the spirit of the invention disclosed and as defined in the appended claims.

What is claimed is:

1. A separator apparatus for separating fracturing effluent received from an oil and gas well, the separating apparatus comprising:

a vessel providing an enclosure for maintaining a liquid bed at a predetermined liquid level at an inlet end of the vessel;

an inlet connected to the inlet end below the predetermined level of the liquid bed to admit the fracturing effluent into the vessel;

a baffle supported in the vessel to slow a velocity of the fracturing effluent in the vessel and effecting settlement of a solid constituent of the fracturing effluent to a bottom of the vessel and a passage of a gaseous constituent of the fracturing effluent to a top of the vessel, the baffle comprising:

a planar plate portion having a perimeter contour matching a characteristic profile of a lateral cross section of the vessel;

a first edge forming an upper opening between the planar plate portion and a top portion of the vessel for passage of the gas constituent above the planar portion;

a second edge forming a lower opening between the planar plate portion and a bottom portion of the vessel for passage of the fracturing effluent below the planar plate portion;

a deflector supported by the planar plate portion and disposed downstream of the lower opening to impede the fracturing effluent passing through the lower opening and thereby slow the velocity of the fracturing effluent; and a first drain connected to the vessel for removing the solid constituent from the vessel;

an outlet connected to the vessel for removing the gaseous constituent from the vessel; and a second drain connected to the vessel for removing a liquid constituent of the fracturing effluent from the vessel, wherein the separator apparatus is operable at a selected pressure of at least up to the formation pressure of the oil and gas well to collect and separate the fracturing effluent from a well site fracture stimulation.

2. The separator apparatus of claim 1 wherein the vessel is capable of withstanding a positive internal pressure, and wherein the vessel supports a relief valve for limiting the internal pressure below a preselected pressure.

3. The separator apparatus of claim 2 further comprising a choke valve supported by the inlet.

4. The separator apparatus of claim 1 wherein the vessel is supportable on a trailer assembly, the trailer assembly comprising:

a wheel assembly supporting one end of the vessel;

a hitch assembly supporting a forward end of the vessel at times when connected to a towing vehicle; and a retractable leg assembly supporting a medial portion of the vessel at times when the hitch assembly is disconnected from the towing vehicle.

5. The separator apparatus of claim 1 wherein the vessel further comprises:

a man way access opening in the vessel having an open position and a closed position, the open position providing access internal to the vessel; and a clean out cap adjacent an opening in the vessel and having an open position and a closed position, wherein the closed position seals said opening and wherein the open position provides access to the first drain.

6. The separator apparatus of claim 1 wherein the baffle further comprises a third edge forming an opening extending through the planar portion near the predetermined liquid level to provide for a reverse flow of the fracturing effluent through the planar portion, wherein the first baffle is characterized as a first baffle supported by the vessel and forming a first separating chamber between the inlet and the first baffle, and wherein the separator apparatus further comprises:

a second baffle supported by the vessel and forming a second separating chamber between the first baffle and the second baffle;

a third baffle supported by the vessel and forming a third separating chamber between the second baffle and the third baffle;

a fourth baffle supported by the vessel and forming a fourth separating chamber between the third baffle and the fourth baffle; and a fifth baffle supported by the vessel and forming a fifth separating chamber between the fourth baffle and the fifth baffle and a sixth separating chamber between the fifth baffle and a forward end of the vessel.

7. The separator apparatus of claim 1 further comprising a sight glass supported by the vessel for monitoring the level of the liquid bed in the vessel.

8. The separator apparatus of claim 1 further comprising a temperature gauge supported by the vessel for monitoring a temperature of the liquid bed in the vessel.

9. The separator apparatus of claim 1 further comprising:
   a level assembly supported by the vessel for controlling the liquid bed to maintain a level in the vessel substantially that of the predetermined liquid level.

10. The separator apparatus of claim 9 wherein the level assembly comprises:
    a float responsive to the level of the liquid bed; and
    a valve operatively connected to the float and opened by the float to remove liquid from the vessel when the level is greater than the predetermined liquid level.

11. The separator apparatus of claim 9 further comprising a recirculation line for flowing liquid from the forward end of the vessel to the inlet.

12. The separator apparatus of claim 1 further comprising a backpressure manifold connected to the outlet for maintaining a predetermined pressure in the vessel.

13. The separator apparatus of claim 12 wherein the backpressure manifold comprises a backpressure valve.

14. The separator apparatus of claim 13 wherein the backpressure manifold further comprises:
    an inlet header fluidly connecting the backpressure valve to the outlet; and
    a valve fluidly connected to the inlet header in parallel with the backpressure valve.

15. The separator apparatus of claim 3 wherein the choke valve comprises:
    a valve supported by the inlet;
    a choke valve housing supported by the valve; and
    a choke bean receivingly disposed in the choke valve housing to meter the fracturing effluent flow into the inlet.

16. The separator apparatus of claim 6 wherein each of the first, second, and third baffles comprises:
    a planar plate portion having a perimeter contour matching a characteristic profile of a lateral cross section of the vessel;
    a first edge forming an tipper opening between the planar plate portion and a top portion of the vessel form passage of the gas constituent past the planar portion;
    a second edge forming an lower opening between the planar plate portion and a bottom portion of the vessel for passage of the fracturing effluent past the planar plate portion;
    a deflector supported by the planar plate portion and disposed downstream of the lower opening to impede the fracturing effluent passing through the lower opening and thereby slow the velocity of the fracturing effluent; and
    a third edge forming an opening extending through the planar portion near the liquid level to provide for a reverse flow of the fracturing effluent past the planar portion.

17. The separator apparatus of claim 16 wherein the deflector comprises a substantially vertical portion imparting a downwardly vertical force to the fracturing effluent passing through the baffle.

18. The separator apparatus of claim 17 wherein the fourth baffle comprises:
    a planar plate portion having a perimeter contour matching a characteristic profile of a lateral cross section of the vessel;
    a first edge forming an upper opening between the planar plate portion and a top portion of the vessel for passage of the gas constituent past the planar plate portion;
    a second edge forming an lower opening between the planar portion and a bottom portion of the vessel for passage of the fracturing effluent past the planar plate portion; and
    a third edge forming an opening extending through the planar portion in fluid communication with a conduit for passing overflow liquid to the forward end of the vessel.

19. The separating apparatus of claim 18 wherein the sixth baffle comprises a substantially planar portion having a contour matching a characteristic profile of a lateral cross section of the vessel and joined thereto to provide a dam over which the liquid constituent spills over into the sixth separating chamber.

20. The separating apparatus of claim 1 further comprising a mist eliminator adjacent the outlet for separating liquid particles from gaseous constituent being drawn from the vessel.

21. A method of separating fracturing effluent from an oil and gas well following a stimulation procedure, the method comprising the steps of:
    admitting a fill liquid at an inlet end of a vessel to form a liquid bed in the vessel having a predetermined liquid level;
    passing fracturing effluent from the fractured oil and gas well into the vessel at a location below the level of the liquid bed;
    maintaining a predetermined internal pressure in the vessel, the predetermined internal pressure being up to or at least to the formation pressure of the oil and gas well to collect and separate the fracturing effluent from a well site fracture stimulation;
    removing fill liquid and a liquid constituent of the fracturing effluent from the vessel for appropriate disposal at a rate to maintain the liquid bed at substantially the same as the predetermined liquid level;
    removing a gaseous constituent of the fracturing effluent from the vessel for appropriate disposal.

22. The method of claim 20 further comprising the step of removing a solid constituent of the fracturing effluent.

23. The method of claim 21, further comprising the step of recirculating a portion of the liquid from a forward end of the vessel to the inlet end to provide a continuous liquid flow through the vessel.

24. A separator apparatus for recovering fracturing effluent from an oil and gas well following a stimulation procedure, the separating apparatus comprising;
    a vessel maintaining a preselected level of a liquid bed therein and the predetermined internal pressure being up to or at least equal to the formation pressure of the oil and gas well to collect and separate the fracturing effluent from a well site fracture stimulation;
    means for submitting the fracturing effluent into the vessel under a static head of the liquid provided by the preselected level; and
    means for separating the fracturing effluent into constituent parts of solid, liquid, and gaseous constituents.

* * * * *

UNITED STATES PATENT AND TRADEMARK OFFICE
CERTIFICATE OF CORRECTION

PATENT NO.   : 6,214,092 B1
DATED        : April 10, 2001
INVENTOR(S)  : Larry G. Odom and Ronnie L. Stovall It is certified that error appears in the above-identified patent and that said Letters Patent is hereby corrected as shown below:

Column 4,
Line 59, replace "of FIG." with -- of FIG. 1. --.
Line 61, replace "line 8-8. 1." with -- line 8-8. --.

Column 12,
Line 8, replace "planar plate portion;" with -- planar plate portion; and --.
Lines 9-13, replace "sub element position" with -- sub-sub element position --.
Line 13, replace "effluent; and" with -- effluent; --.

Column 13,
Line 45, replace "an tipper opening" with -- an upper opening --.
Line 46, replace "vessel form" with -- vessel for --.
Line 48, replace "an lower opening" with -- a lower opening --.

Column 14,
Line 7, replace "an lower opening" with -- a lower opening --.
Line 36, replace "or at least to the" with -- or at least equal to the --.
Line 42, replace "liquid level;" with -- liquid level; and --.
Line 53, replace "comprising;" with -- comprising: --.

Signed and Sealed this

Seventh Day of May, 2002

Attest:

Attesting Officer

JAMES E. ROGAN
Director of the United States Patent and Trademark Office